US007210297B2

(12) United States Patent
Shah et al.

(10) Patent No.: US 7,210,297 B2
(45) Date of Patent: May 1, 2007

(54) METHOD AND APPARATUS FOR IDENTIFICATION OF HOT AND COLD CHAMBERS IN A GAS TURBINE COMBUSTOR

(75) Inventors: Minesh Ashok Shah, Clifton Park, NY (US); Ajai Singh, Clifton Park, NY (US); Willy Steve Ziminsky, Simpsonville, SC (US); Derrick Simons, Greer, SC (US)

(73) Assignee: General Electric Company, Schenectady, NY (US)

( * ) Notice: Subject to any disclaimer, the term of this patent is extended or adjusted under 35 U.S.C. 154(b) by 308 days.

(21) Appl. No.: 10/980,795

(22) Filed: Nov. 4, 2004

(65) Prior Publication Data

US 2006/0090471 A1    May 4, 2006

(51) Int. Cl.
*F02C 7/00* (2006.01)
(52) U.S. Cl. .......................................... 60/772; 60/803
(58) Field of Classification Search ................ 60/772, 60/773, 39.24, 39.281, 803; 374/117
See application file for complete search history.

(56) References Cited

U.S. PATENT DOCUMENTS

| 6,205,765 B1 * | 3/2001 | Iasillo et al. .................. 60/773 |
| 6,955,039 B2 * | 10/2005 | Nomura et al. ............ 60/39.27 |
| 6,979,118 B1 * | 12/2005 | Mick et al. ................. 60/39.24 |

* cited by examiner

*Primary Examiner*—L. J. Casaregola
(74) *Attorney, Agent, or Firm*—Nixon & Vanderhye P.C.

(57) ABSTRACT

A method for identifying combustion characteristics of a plurality combustion chambers in a gas turbine, the method including: supplying fuel to the combustion chambers at a predetermined fuel rate; sensing combustion dynamic pressure in said plurality of combustion chambers and generating dynamic pressure signals representative of the dynamic pressure in each of said combustion chambers, wherein the dynamic pressure signals provide information regarding the dynamic pressure at a plurality of frequencies; segmenting the signals into a plurality of predefined frequency bands; determining a characteristic value for each of the segmented signals, and identifying an order of combustion chambers based on the characteristic value.

19 Claims, 6 Drawing Sheets

METHOD AND APPARATUS FOR IDENTIFICATION OF HOT AND COLD CHAMBERS IN A GAS TURBINE COMBUSTOR

BACKGROUND OF THE INVENTION

This invention relates to monitoring combustion chambers in a gas turbine. In particular, the invention relates to a system and method for automatically identifying combustion chambers operating relatively hot or cold with respect to other chambers.

Dry low NOx (DLN) combustion systems are commonly used in modern industrial gas turbines. DLN combustion chambers receive premixed fuel and air at lean fuel-air (F/A) ratios to achieve low NOx emissions. These combustion systems are also required to comply with other emission constraints such as for carbon monoxide (CO) emissions. The level of emissions are strongly influenced by flame and combustion temperatures in the combustion chambers. Relatively lean A/F ratios and low combustion temperatures minimize $NO_x$ emissions. Because of their lean fuel flow, the chambers of DLN combustion systems are susceptible to burn outs if the F/A becomes too lean in one or more chambers. Individual variations of the F/A in the different chambers of a combustion system may cause some chambers to be more at risk for burn outs than other chambers with higher F/As.

Controlling emission levels is facilitated by operating each of the combustion chambers at uniform flame and combustion temperatures. Because of the non-linear relationships between flame and combustion temperature and emissions, relatively small changes in flame and combustion temperature can result in large changes in emissions. Because of the potentially large variations in emission levels, the combustion temperatures in each chamber of a combustion system should be uniform. To maintain uniform temperatures, the fuel to air (F/A) ratio in each combustion chamber should be substantially the same.

The F/A ratios may differ slightly from chamber to chamber in a combustion system. These chamber-to-chamber differences in the F/A ratios yield differences in the flame and combustion exhaust temperatures between the chambers and in turn cause the emission levels to differ from chamber to chamber. The differences in emission characteristics between the chambers are often relatively large and do not average out due to the non-linear transfer relationships between combustion temperatures and NOx and CO emissions. Accordingly, there has been a difficulty in maintaining uniform emission levels across all DLN combustion chambers in a combustion system of an industrial gas turbine.

Control systems regulate the flow of fuel to the combustion system to, in part, ensure that emissions comply with emission limits imposed on the gas turbine. Recent gas turbine fuel control systems enable the F/A ratio to individual combustion chambers to be dynamically adjusted. Individual control of the F/A ratio for each chamber is provided by fuel nozzle tuning valves and orifice plates that regulate fuel and air flow to a combustion chamber. The tuning valves and orifice plates may be dynamically adjusted during operation of the combustion system. A computerized fuel control system adjusts the tuning valves and/or orifice plates to each combustion chamber to, for example, achieve uniform flame and combustion temperatures. To make appropriate adjustments to the tuning valves and orifice plates, the control system requires data regarding the operation of the individual chambers.

There is a need for systems and methods to sense and collect data regarding the operating conditions in individual combustion chambers. This data may be applied to identify chambers operating relatively hot or cold as compared to other chambers. In the past, a correlation between combustion dynamic pressure frequencies and combustion temperature has been used to identify combustion chambers operating relatively hot or cold. Dynamic pressure sensors in combustion chambers detect combustion frequency tones in the chambers. Relatively low combustion frequencies are associated with cold chambers and high combustion frequencies are associated with hot chambers. Frequency tones in a range of 70 hertz (Hz) to 120 Hz are associated with combustion chambers operating at relatively cold combustion conditions, and tones in a range of the 120 Hz to 160 Hz region are associated with hot combustion chambers.

When the hot and cold combustion tones exist simultaneously in the same chamber it is difficult to determine whether the chamber is operating hot or cold. To determine whether a chamber is operating hot or cold when hot and cold tones frequency coexist, the amplitudes of the different combustion frequency tones have been used to determine whether a chamber is operating hot or cold. However, relying solely on combustion dynamic pressure frequencies and their amplitudes has not proven to be a robust method to identify hot and cold chambers.

The exhaust temperature sensed at the exit of the turbine has also been used to identify hot and cold combustion chambers See U.S. Pat. No. 6,460,346 and U.S. Patent Publication 2004/0148940. Thermocouples (TC) are arranged in an array at the turbine exhaust. These thermocouples provide a temperature profile of a cross-sectional area of the exhaust gas. It has been found that there should be twice as many TCs as combustion chambers to reliably use the exhaust temperature profile to detect hot and cold chambers. In addition, swirl charts are used to correlate the rotation of the combustion gasses to measured gas turbine parameters such as megawatt turbine output, compressor discharge pressure and firing temperature. These correlations may not be entirely accurate and often introduce uncertainty to ordering of combustion chambers on the basis of temperature.

There is a need for techniques to reliably identify combustion chambers operating hot or cold relative to the other chambers in the combustion system of a gas turbine. The system should accurately identify hot and cold chambers and rank the chambers based on their combustion temperatures.

SUMMARY OF THE INVENTION

A system and method have been developed to identify hot and cold combustion cans based on a combination of data including combustion dynamic signals of each combustion chamber and exhaust temperature measurements. In addition, the data may be collected at gas turbine test conditions selected to amplify chamber-to-chamber combustion variations, such as by operating the combustion chambers at leaner fuel-air (F/A) ratios than would be used during normal gas turbine operation to drive the chambers near their lean burn out (LBO) limits.

By appropriate signal processing of the combustion dynamic pressure signals to collect combustion dynamics data and by combining that data with exhaust temperature information at selected test conditions, the combustion chambers may be ranked from hottest to coldest chambers. The processing of the combustion dynamic pressure signals may include determining the combustion energy at each of several selected combustion frequency bands, e.g., ranges of pressure wave frequencies. The combustion energy at the selected frequency bands are used to rank the combustion chambers from hottest to coldest. Exhaust temperature information is used to validate the temperature ranking of combustion chambers. The chambers may be ranked from hottest to coldest during testing, initial setup of the combustion system or while the gas turbine is operated at the selected test conditions. The order of chambers from hot to cold provides information useful for scheduling fuel flow and fuel splits to the chambers and for the control system that adjusts the fuel and/or air flow to the combustion chambers.

The invention may be embodied as a method for identifying combustion characteristics of a plurality combustion chambers in a gas turbine, the method including: supplying fuel to the combustion chambers at a predetermined fuel rate; sensing combustion dynamic pressure in said plurality of combustion chambers and generating dynamic pressure signals representative of the dynamic pressure in each of said combustion chambers, wherein the dynamic pressure signals provide information regarding the dynamic pressure at a plurality of frequencies; segmenting the signals into a plurality of predefined frequency bands; determining a characteristic value for each of the segmented signals, and identifying an order of combustion chambers based on the characteristic value.

The invention may also be practices as a method for identifying combustion characteristics of a plurality dry low nitrogen-oxide (DLN) combustion chambers in a gas turbine, said method comprising: supplying fuel to the combustion chambers at a predetermined fuel rate abnormally near a lean blow out (LBO) condition of the chambers; sensing combustion dynamic pressures in said combustion chambers and generating dynamic pressure signals representative of the dynamic pressure in each of said combustion chambers, wherein the dynamic pressure signals provide information regarding the dynamic pressure at a plurality of frequencies; segmenting the signals into a plurality of predefined frequency bands comprising a lean blow out (LBO) precursor frequency band, a cold tone frequency band and a hot tone frequency band; determining a value for each chamber representative of amplitudes of the signals in each of LBO precursor frequency band, the cold tone frequency band and the hot tone frequency band, wherein the value is characteristic of a combustion temperature within the chamber, and ranking a plurality of the combustion chambers in an order of the combustion temperature.

The invention may also be embodied as a system for ranking combustion chambers in a gas turbine in order of chamber combustion temperature comprising: at least one fuel nozzle supplying fuel to the combustion chambers at a predetermined fuel rate abnormally near a lean blow out (LBO) condition of the chambers; at least one dynamic pressure sensor in each chamber sensing combustion dynamic pressures in said combustion chambers and generating dynamic pressure signals representative of the dynamic pressure in each of said combustion chambers, wherein the dynamic pressure signals provide information regarding the dynamic pressure at a plurality of frequencies; a signal band pass filter segmenting the signals into a plurality of predefined frequency bands comprising a lean blow out (LBO) precursor frequency band, a cold tone frequency band and a hot tone frequency band; a processor determining a value for each chamber representative of amplitudes of the signals in each of LBO precursor frequency band, the cold tone frequency band and the hot tone frequency band, wherein the value is characteristic of a combustion temperature within the chamber, and said processor ranking a plurality of the combustion chambers in an order of the combustion temperature.

DESCRIPTION OF THE DRAWINGS

The systems and methods of the present invention are described herein below with reference to various figures, in which.

DETAILED DESCRIPTION OF THE INVENTION

Figure 1:
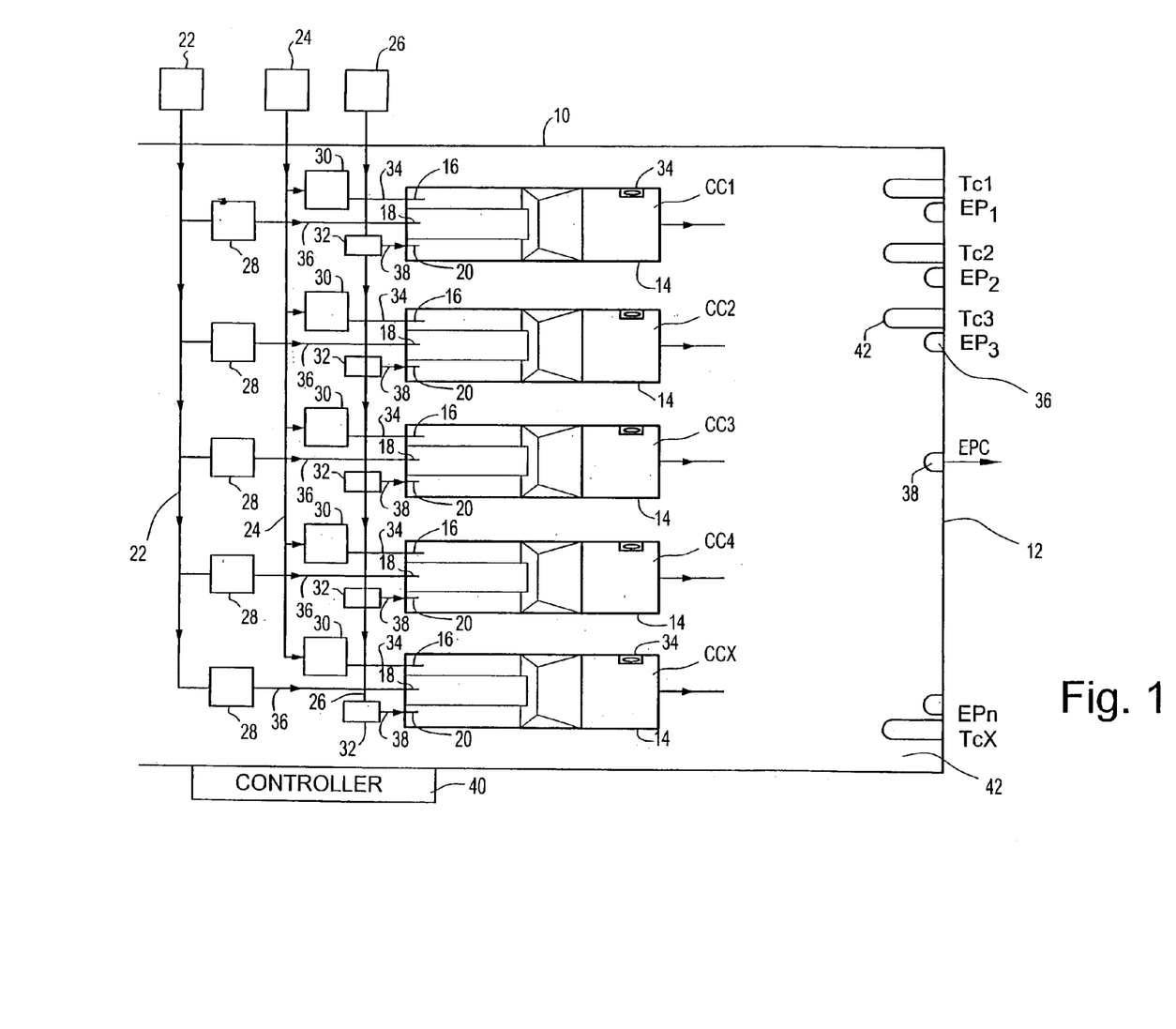
FIG. 1 is a schematic side view of combustion chambers in a gas turbine showing multiple manifolds as well as exhaust thermocouples.

FIG. 1 shows a schematic partial cross-sectional view of a combustion system 10 of a gas turbine. Gas turbines, especially industrial gas turbines, often have multiple combustion chambers 14 and within each chamber are multiple fuel nozzles 16, 18, 20. Each nozzle has its own fuel tuning control valve 28, 30, 32 to control the fuel flowing to the nozzle. Multiple fuel manifolds 22, 24, 26 supply fuel to the fuel nozzles in the multiple combustion chambers. The fuel control valves are mounted on the manifolds such that the weight of the fuel tuning control valves and the nozzles are carried by the manifolds, rather than the multiple combustion chambers. A fuel and/or combustion air controller 40 adjusts the fuel tuning valves to control the fuel flow and splits to individual chambers, and the rate of fuel flow to all chambers by controlling the flow to each of the manifolds.

High pressure air from the compressor flows to the combustion chambers where the air is mixed with fuel. Fuel is injected into the chambers through nozzles. The rate of fuel flow and the split of fuel to the different nozzles in each chamber is governed by the controller 40. The controller may govern both the collective flow and splits to all chambers and the individual fuel flow and splits to each chamber. Hot gases generated by the combustion of the air and fuel mixture flow from the combustion chambers to the turbines which generally include a high-pressure turbine to drive the compressor and a low-pressure turbine to provide output power. Exhaust gas from the turbines is discharged.

FIG. 1 does not show the air compressor or details about the supply of combustion air to the gas turbine, as these details are known and conventional in the art. The turbine exhaust outlet 12 of the gas turbine is downstream of the combustion chambers and associated turbine. The multiple combustion chambers 14 are shown as combustion chamber number 1 (CC1), combustion chamber number 2 (CC2), combustion chamber number 3 (CC3), combustion chamber number 4 (CC4), and so on around the gas turbine casing to combustion chamber (CCX). Depending on the energy output desired for the gas turbine, the number of combustion chambers 14 varies. A typical industrial gas turbine has ten to fourteen combustion chambers arranged in an annular array around a turbine casing.

At the exhaust outlet 12 of the gas turbine are multiple thermocouples 42 arranged about the periphery of the gas turbine. The number of thermocouples 42 (TC1, TC2, TC3 ... TC$_n$) is a mater of design. For an industrial gas turbine having ten to fourteen combustion chambers, twenty to twenty-eight thermocouples are arranged in a circular array. The number of combustion chambers, manifolds, nozzles and thermocouples can vary depending on the desired energy output from the gas turbine. The dynamic pressure level in each of the combustion chambers may be monitored by dynamic pressure sensors 34. Also included in the periphery of the gas turbine 10 are emission sensor ports (EP1, EP2, EP3 ... EPn) 36 distributed around the circumference of the exhaust turbine stream. It is also common to have at-least one emission sensor port (EPC) 38 at a center of the exhaust gas stream that measures the overall emissions from the entire exhaust stream.

The combustion chambers 14 may be DLN combustion chambers. The fuel to the DLN combustion chamber is split such that premixed fuel and air are injected to a primary combustion zone in the chamber and additional combustion fuel and air are injected into the chamber downstream of the primary combustion zone. Each chamber may have a fuel tuning valve(s) 28, 30, 32 that individually regulates the fuel flow to the various nozzles in the chamber. These tuning valves may be automatically adjusted by the fuel controller 40 to regulate the fuel-air (F/A) ratio to each nozzle of each individual chamber. The tuning valves 28, 30, 32 are each electronically controlled by a respective actuator that is in wired or wireless communication with a trim valve control system 40. The control system 40 may be a computer or microprocessor system that executes valve control algorithms based on certain inputs, such as fuel mode, exhaust gas temperature annular distribution and dynamic pressure in the combustion chambers.

The fuel control system 40 transmits control signals to the actuators to adjust the fuel tuning valves 28, 30 and 32. The computer control system 40 may operate in accordance with executable fuel control algorithms stored in the computer controller. The control system may also receive exhaust temperature data from temperature sensor thermocouples 42 in the exhaust, from dynamic pressure sensors 34 in the combustion chambers, emissions data (EP1 to EPn and EPc) collected from emission sensors 36, 38 in the gas turbine exhaust, gas fuel pressure data from the manifolds and other data regarding the operating conditions of the gas turbine.

The combustion dynamics signals collected by the pressure sensors 34 provide data useful to identify cold and hot combustion chambers and those chambers at risk for flame loss. For example, a precursor for a lean blow out (LBO) event has been identified for multi-nozzle combustion systems. The precursor is associated with the 10 Hz to 25 Hz region of the frequency spectrum of the combustion pressure dynamics. A LBO event may occur if the F/A ratio becomes so lean such that the chamber cannot support a flame. A lean F/A ratio corresponds to a lower flame and firing temperature and hence a cold chamber and lower frequency combustion dynamic pressures.

There is a correlation between lean F/A ratios and the frequencies and amplitudes of the combustion pressure dynamics. For example, as the F/A ratio becomes increasingly lean, the amplitudes of the cold tone frequencies, e.g., 70 Hz to 120 Hz, increase and the amplitudes of the hot tones, e.g., 120 Hz to 160 Hz, decrease. The energy in a frequency band is related to the amplitude of the frequencies in the band. By calculating the energy in the LBO precursor frequency band, the cold tone frequency band and the hot tone frequency band, an energy ratio can be determined for each chamber. The energy ratio may be used to rank the chambers from coldest to hottest. An energy ratio (ER) that can be determined from the following equation (Eq. 1):

$$ER = (RMS(LBO\ \text{Tone}) + RMS(\text{Cold Tone})) / RMS(\text{Hot Tone}) \quad \text{(Eq. 1)}$$

RMS refers to the root mean square of the amplitudes of the combustion dynamic pressures over a predetermined sampling period in each of the frequency ranges corresponding to the LBO tone precursor, cold tones and hot tones. The ER ratio may be determined periodically or continuously during operation of the gas turbine. The ER ratio correlates well with the chamber F/A ratio. By tracking the ER ratio over a range of operating points for all combustion chambers, an assessment of which chambers tend to operate hot and which chambers operate cold can be determined.

Figure 2:
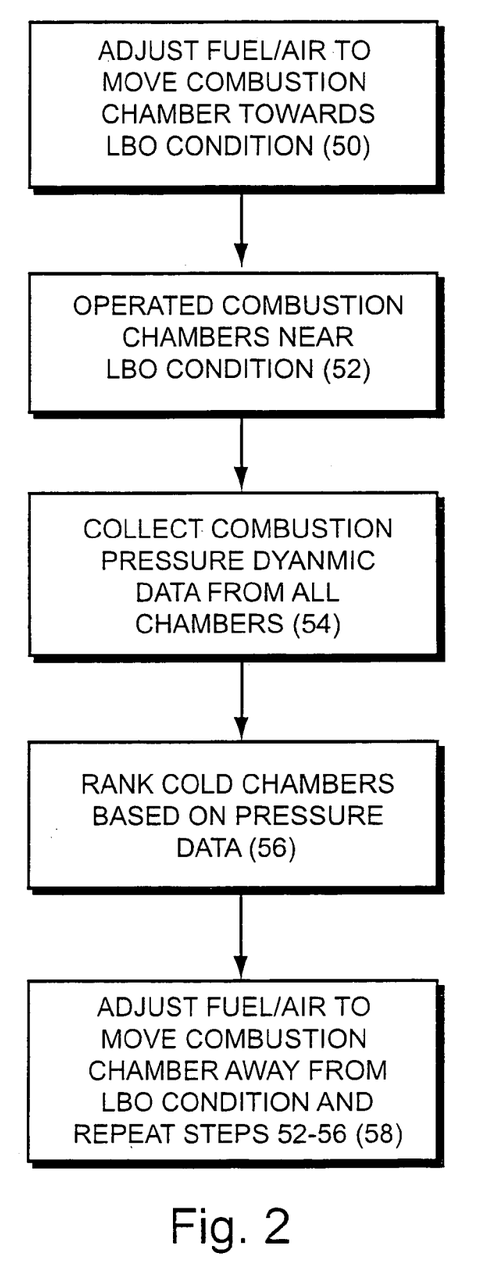
FIGS. 2 and 3 are flow charts of an exemplary method for identifying hold and cold combustion chambers.

FIG. 2 is a flow chart of steps of an exemplary method to identify and rank chambers by their relative combustion chambers. The chambers of a combustion chamber are to be ranked based on their tendency to operate cold or hot relative to the other chambers. To rank the chambers, the combustion system is operated at F/A ratios that cause the cold chambers fo operate near their LBO limit and at F/A ratios that cause the hot chambers to be relatively very hot. Operating the combustion system abnormally to accentuate hot and cold chamber behavior assist in determining whether individual chambers operate cold or hot. To vary the combustion operational conditions, the fuel split schedule to all chambers may be may be adjusted to reduce fuel flow to certain fuel nozzles in each chamber to drive all chambers towards their LBO limits, in step 50. The fuel split schedule may also be adjusted to increase fuel flow to certain nozzles to increase the combustion temperatures while hot chambers are ranked.

While operating near their LBO limits, in step 52, combustion pressure dynamics in the cooler chambers will exhibit the LBO precursor characteristics to a greater extent than will chambers operating at higher combustion temperatures. Chambers that tend to operate relatively cooler will have combustion dynamic pressures at the known LBO precursor combustion frequencies, e.g., in a frequency band of 10 Hz to 25 Hz. In step 54, data is collected from the dynamic pressure sensors 34 in all chambers while the F/A ratio is varied.

The degree to which the cold chambers are cooler than other chambers can be determined, in step 56, by analyzing the energy ratios (ER) of each of the chambers as they operate near LBO. Equation 1 may be applied to determine ER ratios that indicate the degree to which cold chambers are operating with cooler combustion temperatures.

The degree to which hot combustion chambers operate hotter than other chambers may be determined by adjusting the fuel/air flow to all chambers away from their LBO limit and determining their ER ratios, in step 58. While the chambers are operated away from the LBO limit, steps 52 to 56 are repeated to identify the degree to which the hot chambers operate hotter than other chambers. The steps 52 to 58 may be repeated for various gas turbine lead values, e.g., base load 90 megawatts (MW) and R5MW. Using the information regarding the ER ratios of the cold and hot chambers, the chambers can be ranked by degree of cold and hot combustion tendencies.

Figure 4:
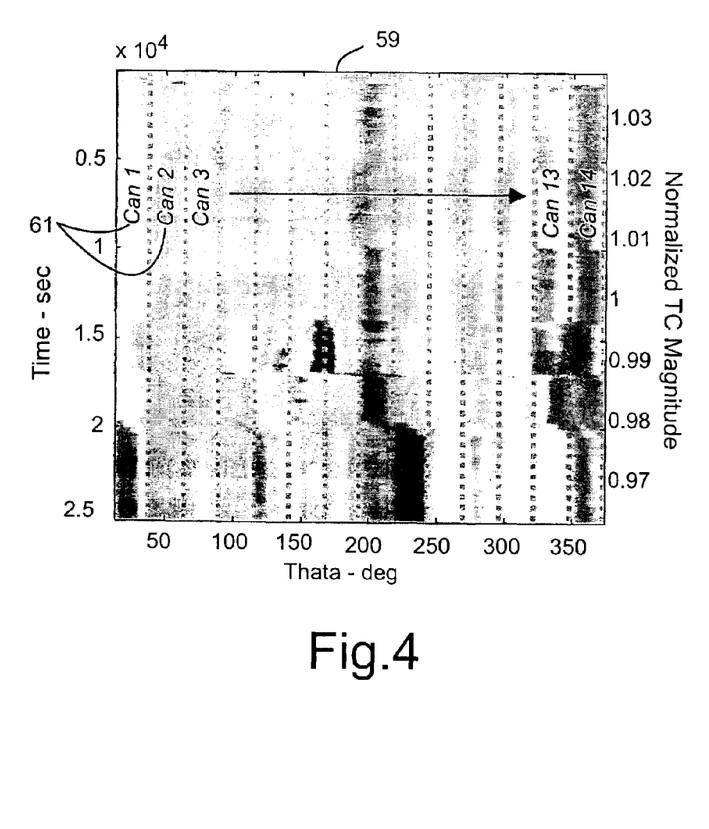
FIG. 4 is an exhaust gas temperature profile for a period time.
Figure 5:
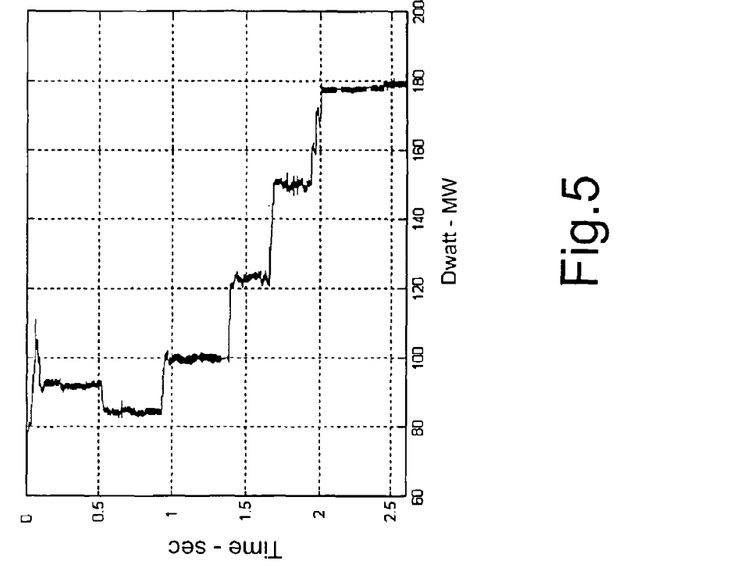
FIG. 5 is an output power chart for a gas turbine for a period of time.

FIG. 4 is a temperature chart 59 of time (zero to $2.5 \times 10^4$ seconds) versus angular position in degrees of the temperature profile of exhaust temperatures, The temperature profile chart 59 has been segmented to identify regions corresponding to each combustion chamber (CAN). FIG. 5 is a chart of time (zero to 2.5x 104 seconds) versus gas turbine power output in megawatts (DWatt). A comparison of FIGS. 4 and 5 shows that as the gas turbine power output changes, the temperature profile of the exhaust makes a corresponding angular shift. This shift reflects that the rotation of combustion gases in the turbine increases or decreases as the load and speed of the gas turbine changes.

Figure 3:
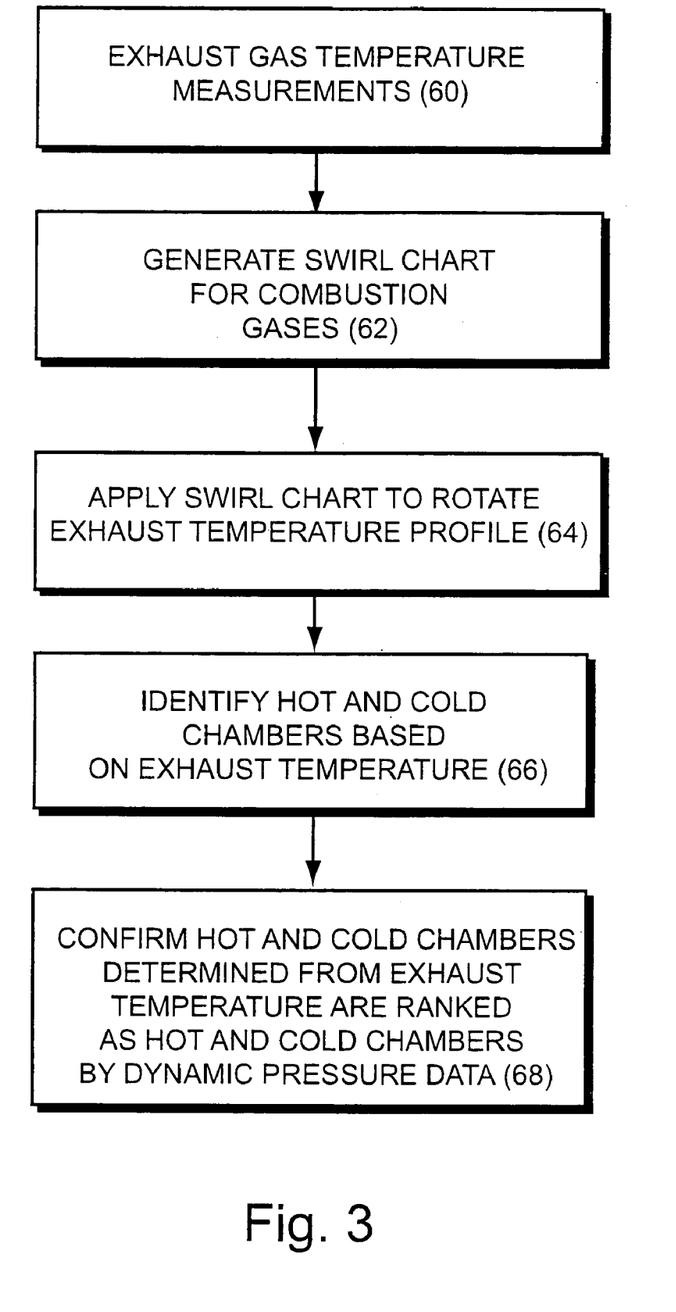

FIG. 3 is a flow chart of steps to confirm the ranking of combustion chambers. To increase the confidence in the combustion temperature ranking of the chamber, the ranking preformed with the combustion dynamics data may be confirmed using exhaust temperature measurements. The array of thermocouples (TC) 42 are used to collected circumferential temperature measurements of the exhaust gas at location downstream of the turbine exit in step 60. The circumferential temperature profile of the exhaust gases provides insight into the chamber-to-chamber combustion temperature variations.

To correlate the exhaust gas temperature profile to individual combustion chamber, the temperature profile is rotated to account for combustion gas rotation and mixing that occurs as the combustion gasses pass from the combustion system 10 to the turbine exhaust 12. A swirl chart may be used to rotate the exhaust gas temperature profile so that it corresponds to the chambers of the combustion system. A swirl chart may be generated by monitoring the exhaust temperatures as one or a small group of combustion chambers are operated relatively cold or hot and the gas turbine is slowly unloaded, in step 62. The temperature profiles obtained during this unloading process, may be used to generate swirl charts at various gas turbine load settings. The swirl chart is applied to adjust for the effects of combustion gas rotation and mixing on the exhaust temperature profiles in step 64. Using the swirl charts and exhaust temperature profiles, the cold and hot areas in the temperature profile can be correlated to individual combustion chambers in step 66. The identification of hot and cold combustion chambers based on exhaust temperatures may be applied to confirm the temperature ranking of chambers preformed with the energy ratios derived from the combustion dynamic sensor data in step 68.

Figure 6:
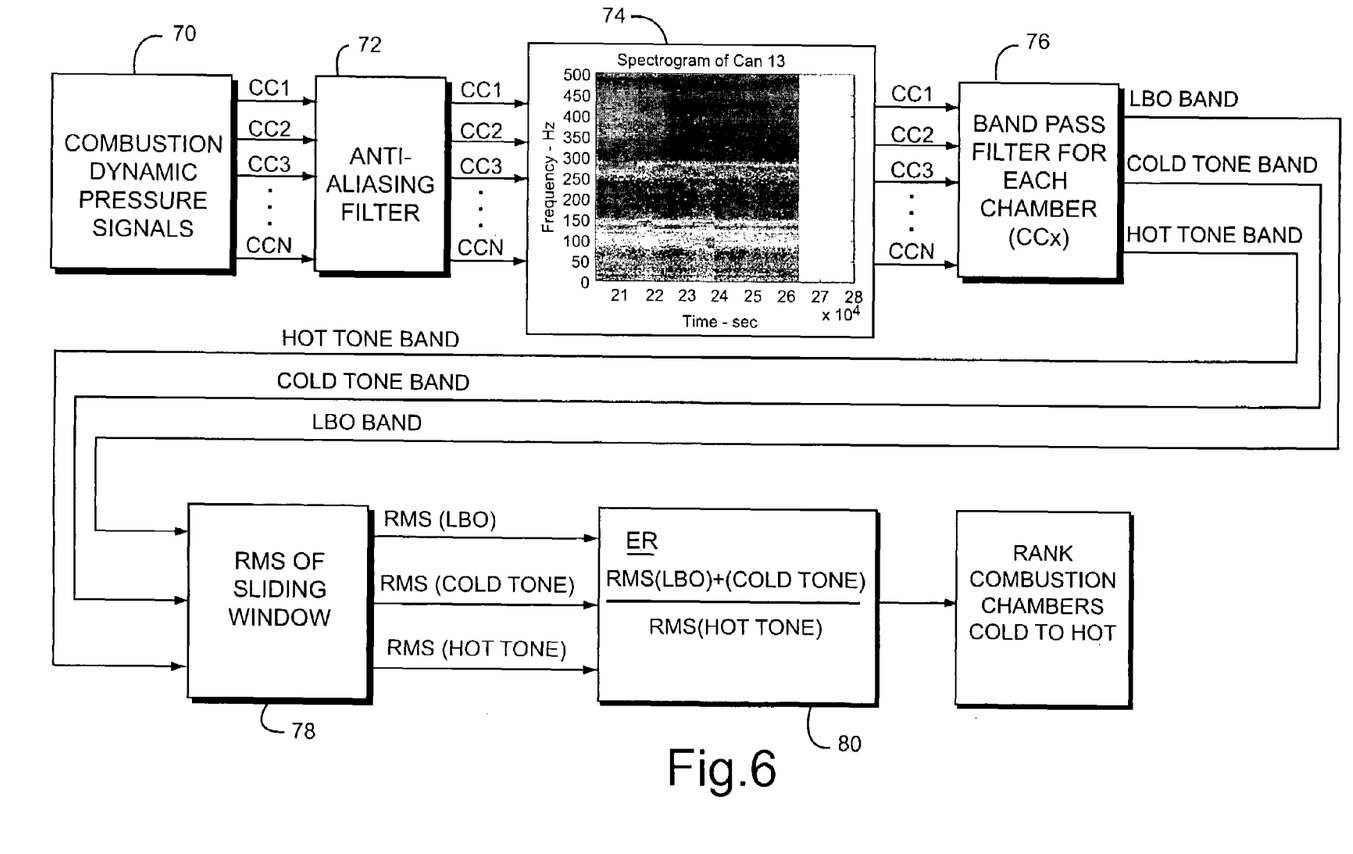
FIG. 6 is a schematic diagram of a system for collecting and analyzing combustion dynamic pressure signals.
Figure 7:
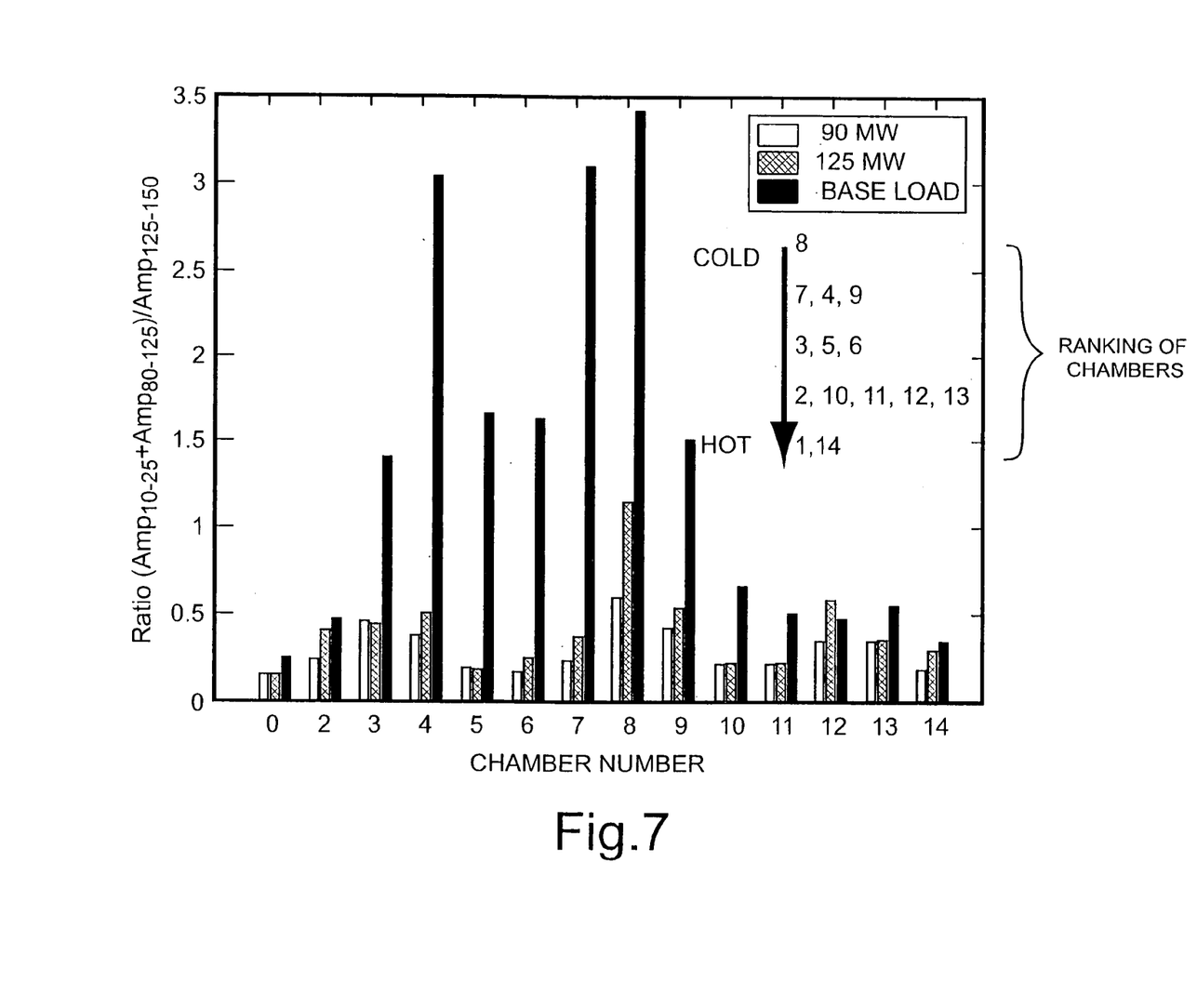
FIG. 7 is a combustion chamber ranking chart.

FIG. 6 is a chart for an exemplary signal processing system that may be used to monitor combustion dynamics in the combustion chambers and process the combustion dynamics signals. Signals 70 of the combustor dynamic pressures over a wide range of frequencies are generated by the dynamic pressure sensors 34 coupled to each combustion chamber 14. The control system 40 receives the combustion dynamic pressure signals from each of the chambers (CCI and CCN) which may first passed the signals through an anti-aliasing filter 72 to minimize high frequency noise in the signal. A graph 74 illustrates an exemplary trace of the signal (Hertz) versus time (second ×104) for a single chamber after the noise is minimized. Each chamber will have its own associated pressure signal graph. Band pass filters 76 separates the dynamic pressure signals into the LBO band, e.g., 10 to 25 Hz, a cold tone band, e.g., 70 to 120 Hz and a hot tone band, e.g., 120 to 160 Hz. A root mean square (RMS) of the signal amplitude in each of the frequency bands for each chamber is determined using an N point sliding window 78. The sliding window is a moving time period in which the signal peak is sampled N times. The resulting RMS signal is an average of the N signal peaks and is a low pass filtered signal. The RMS signal is a moving average that is continually calculated as the sliding window moves with time. The RMS is analogous to the energy in the signal in the corresponding frequency band. The RMS valves are applied to characterize the hot/cold tendency of each chamber. For example, using equation 9, the ER valves are determined by 80 and used to rank the chambers as is shown in the graph of FIG. 7. The ranking may then be compared to the temperature profile to validate the order of hot to cold chambers, While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for identifying combustion characteristics of a plurality combustion chambers in a gas turbine, said method comprising:
   a. supplying fuel to the combustion chambers at a predetermined fuel rate;
   b. sensing combustion dynamic pressure in said plurality of combustion chambers and generating dynamic pressure signals representative of the dynamic pressure in each of said combustion chambers, wherein the dynamic pressure signals provide information regarding the dynamic pressure at a plurality of frequencies;
   c. segmenting the signals into a plurality of predefined frequency bands;
   d. determining a characteristic value for each of the segmented signals, and
   e. identifying an order of combustion chambers based on the characteristic value.

2. The method as in claim 1 further comprising confirming the order of combustion chambers based on gas temperatures of exhaust from a turbine of the gas turbine.

3. The method as in claim 2 wherein the gas temperatures of the exhaust are correlated to the combustion chambers by rotating the temperatures by an angle corresponding to a rotation imparted by the turbine to gases generated by the chambers.

4. The method as in claim 1 wherein the characteristic value is an energy ratio of the segmented signals.

5. The method as in claim 4 wherein the energy ratio is a ratio of average peak amplitudes of the segmented signals.

6. he method as in claim 4 wherein the energy ratio is a ratio of root mean square values of a plurality of peak signal values in a sliding time period of the plurality of predefined frequency bands.

7. The method as in claim 1 wherein the predefined frequency bands comprise a band corresponding to a lean burn out (LBO) precursor frequency band, a cold tone frequency band and a hot tone frequency band.

8. The method as in claim 1 wherein the predefined frequency bands comprise a band corresponding to a lean burn out (LBO) precursor frequency band of 10 hertz (Hz) to 25 Hz, a cold tone frequency band of 70 Hz to 120 Hz, and a hot tone frequency band of 120 Hz to 160 Hz.

9. The method of claim 7 wherein the characteristic value is determined from a moving average of peak signal amplitudes of the signal in each of the LBO precursor frequency band, the cold tone frequency band and the hot tone frequency band.

10. The method of claim 9 wherein the characteristic value is a ratio of a sum the moving average of peak signal amplitudes of the signals in the LBO precursor frequency band and the cold tone frequency band, and of the moving average of peak signal amplitudes in the hot tone frequency band.

11. The method of claim 1 wherein the predetermined fuel rate is below a normal operating fuel flow rate and near a lean blow out fuel limit.

12. A method for identifying combustion characteristics of a plurality dry low nitrogen-oxide (DLN) combustion chambers in a gas turbine, said method comprising:
   a. supplying fuel to the combustion chambers at a predetermined fuel rate abnormally near a lean blow out (LBO) condition of the chambers;
   b. during step (a), sensing combustion dynamic pressures in said combustion chambers and generating dynamic pressure signals representative of the dynamic pressure in each of said combustion chambers, wherein the dynamic pressure signals provide information regarding the dynamic pressure at a plurality of frequencies;
   c. segmenting the signals into a plurality of predefined frequency bands comprising a lean blow out (LBO) precursor frequency band, a cold tone frequency band and a hot tone frequency band;
   d. determining a value for each chamber representative of amplitudes of the signals in each of LBO precursor frequency band, the cold tone frequency band and the hot tone frequency band, wherein the value is characteristic of a combustion temperature within the chamber, and
   e. ranking a plurality of the combustion chambers in an order of the combustion temperature.

13. The method as in claim 12 further comprising confirming the order of combustion chambers based on gas temperatures of exhaust from a turbine of the gas turbine.

14. The method as in claim 13 wherein the gas temperatures of the exhaust are correlated to the combustion chambers by rotating the temperatures by an angle corresponding to a rotation imparted by the turbine to gases generated by the chambers.

15. The method as in claim 13 wherein the characteristic value is an energy ratio of the segmented signals.

16. The method as in claim 15 wherein the energy ratio is a ratio of a moving average peak amplitudes of the segmented signals.

17. The method as in claim 15 wherein the energy ratio is a ratio of root mean square values of a plurality of peak signal values in a sliding time period of the plurality of predefined frequency bands.

18. The method as in claim 12 wherein the lean burn out (LBO) precursor frequency band is 10 hertz (Hz) to 25 Hz, the cold tone frequency band is 70 Hz to 120 Hz, and the hot tone frequency band is 120 Hz to 160 Hz.

19. The method of claim 12 wherein the characteristic value is a ratio of a sum the moving average of peak signal amplitudes of the signals in the LBO precursor frequency band and the cold tone frequency band, and of the moving average of peak signal amplitudes in the hot tone frequency band.

* * * * *